United States Patent
Yin et al.

(10) Patent No.: US 10,657,721 B2
(45) Date of Patent: May 19, 2020

(54) SYSTEMS AND METHODS FOR PROVIDING AUGMENTED REALITY SUPPORT FOR VEHICLE SERVICE OPERATIONS

(71) Applicant: PACCAR Inc, Bellevue, WA (US)

(72) Inventors: David Wei-Cheng Yin, Flower Mound, TX (US); Dirk Maiwald, El Paso, TX (US); William Timothy Ryan, Jr., Lantana, TX (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 15/893,342

(22) Filed: Feb. 9, 2018

(65) Prior Publication Data

US 2019/0251747 A1    Aug. 15, 2019

(51) Int. Cl.

| | | |
|---|---|---|
| *G06T 19/00* | (2011.01) | |
| *G06T 19/20* | (2011.01) | |
| *G06T 7/73* | (2017.01) | |
| *G06K 9/00* | (2006.01) | |
| *G06F 30/00* | (2020.01) | |
| *G06F 111/20* | (2020.01) | |

(52) U.S. Cl.
CPC ............ *G06T 19/006* (2013.01); *G06F 30/00* (2020.01); *G06K 9/00671* (2013.01); *G06T 7/74* (2017.01); *G06T 19/20* (2013.01); *G06F 2111/20* (2020.01); *G06T 2200/24* (2013.01); *G06T 2207/30204* (2013.01); *G06T 2207/30248* (2013.01); *G06T 2219/2016* (2013.01)

(58) Field of Classification Search
CPC ......... G06T 2207/30164; G06T 19/006; G06T 19/20; G06T 2219/2004; G06T 2219/2208; G06T 2219/2016; G06T 17/005; G06T 2207/30248; G06T 2207/30252; G06T 2207/30204; G06Q 10/20; G06F 17/5095; G06F 2217/02
See application file for complete search history.

(56) References Cited

U.S. PATENT DOCUMENTS

| | | |
|---|---|---|
| 8,948,456 B2 | 2/2015 | Schumacher |
| 9,330,465 B2 | 5/2016 | Schumacher |
| 9,472,028 B2 | 10/2016 | Abdel-Rahman et al. |
| 9,589,390 B2 | 3/2017 | DeStories et al. |

(Continued)

OTHER PUBLICATIONS

International Search Report and Written Opinion dated May 1, 2018, issued in corresponding International Application No. PCT/US2018/017681, filed Feb. 9, 2018, 16 pages.

*Primary Examiner* — Ke Xiao
*Assistant Examiner* — Andrew Shin (57) ABSTRACT

In some embodiments of the present disclosure, augmented reality and/or virtual reality technologies are used to present information for a vehicle to a technician. A virtual object model file that includes a context model and at least one assembly detail model is created based on a vehicle design model. A VR/AR device uses its camera to generate video of a vehicle, and superimposes a depiction of a vehicle component or assembly from the virtual object model file over the video in the location in which the vehicle component or assembly is actually located, as if the vehicle were "see-through." The VR/AR device may then also allow the technician to select specific components of the depicted assembly in order to retrieve and display detailed information about the component.

20 Claims, 10 Drawing Sheets

(56) References Cited

U.S. PATENT DOCUMENTS

| | | | |
|---|---|---|---|
| 9,928,544 B1* | 3/2018 | Hasan | G06Q 30/0643 |
| 2002/0044104 A1 | 4/2002 | Friedrich et al. | |
| 2004/0098151 A1* | 5/2004 | Carlucci | G06F 17/50 |
| | | | 700/95 |
| 2005/0022152 A1* | 1/2005 | Turk | G06F 17/5018 |
| | | | 717/100 |
| 2005/0035980 A1 | 2/2005 | Lonsing | |
| 2006/0037760 A1* | 2/2006 | Froland | A62C 27/00 |
| | | | 169/24 |
| 2006/0250421 A1* | 11/2006 | Anderson | G06T 15/40 |
| | | | 345/629 |
| 2008/0129115 A1 | 6/2008 | Baumann et al. | |
| 2012/0040612 A1 | 2/2012 | Lee et al. | |
| 2014/0309870 A1 | 10/2014 | Ricci et al. | |
| 2015/0302639 A1* | 10/2015 | Malekian | G06F 17/2288 |
| | | | 345/420 |
| 2015/0371455 A1 | 12/2015 | Abdel-Rahman et al. | |
| 2016/0224022 A1* | 8/2016 | Yvon | G05B 19/41865 |
| 2017/0018067 A1 | 1/2017 | Rourke et al. | |
| 2017/0091375 A1* | 3/2017 | Lu | G06Q 10/20 |
| 2018/0074332 A1* | 3/2018 | Li | G06F 1/163 |

* cited by examiner

SYSTEMS AND METHODS FOR PROVIDING AUGMENTED REALITY SUPPORT FOR VEHICLE SERVICE OPERATIONS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of providing an augmented reality presentation of a component of a vehicle using a virtual reality/augmented reality (VR/AR) device is provided. The VR/AR device receives an indication of a vehicle type. The VR/AR device retrieves a virtual object model file associated with the vehicle type. The VR/AR device presents an instruction to attach a marker to the vehicle at a predetermined location specified in the virtual object model file. The VR/AR device receives a selection of an assembly of the vehicle. The VR/AR device determines a position and an orientation of the VR/AR device with respect to the marker. The VR/AR device presents an augmented reality depiction of an assembly detail model that is included in the virtual object model file and is associated with the selected assembly.

In some embodiments, a method of generating a virtual reality/augmented reality (VR/AR) model of a vehicle for presentation by a VR/AR device is provided. A computing device exports a first set of components from a computer-aided design (CAD) model to create an assembly detail model. A computing device exports a second set of components from the CAD model to create a context model. A computing device combines the exported first set of components and the exported second set of components to create a raw virtual object model file. A computing device transforms the raw virtual object model file to match a coordinate system used in a VR/AR environment to create a final virtual object model file. A computing device provides the final virtual object model file to a VR/AR device for presentation to a user.

In some embodiments, a system is provided that comprises a vehicle, a marker, and a virtual reality/augmented reality (VR/AR) device. The vehicle includes a cab, a set of frame rails, and a wire harness. The VR/AR device includes a camera and a display. The VR/AR device is configured to receive an indication of a type of the vehicle; retrieve a virtual object model file associated with the vehicle type; present an instruction to attach the marker to the vehicle at a predetermined location specified in the virtual object model file; receive a selection of an assembly of the vehicle, wherein the assembly is the wire harness; determine a position and an orientation of the VR/AR device with respect to the marker using the camera; and present an augmented reality depiction of an assembly detail model that is included in the virtual object model file and is associated with the wire harness.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Vehicle systems are becoming increasingly complicated. While technicians are often well trained and have an intuitive understanding of how to access, disassemble, and reassemble vehicle assemblies, technicians often do not have an encyclopedic knowledge of every vehicle system or configuration. For example, technicians often consult wiring schematics and other detail-oriented information while servicing vehicles. Unfortunately, wiring schematics are normally drawn in a logical format, and so do not visually match what would appear on the vehicle. Further, as the wiring designs within vehicles become more complicated, it may no longer be possible to intuitively determine where a given wiring harness may be routed. What is needed is a way to present technicians with relevant information to their maintenance and service tasks in a format that is highly intuitive.

In some embodiments of the present disclosure, augmented reality and/or virtual reality technologies are used to present information for a vehicle to a technician. As used herein, the simplified term "VR/AR" refers to virtual reality technology, augmented reality technology, or both virtual reality and augmented reality technology. The simplified term is used for ease of discussion. A VR/AR device uses its camera to generate video of a vehicle, and superimposes a depiction of a vehicle component or assembly over the video in the location in which the vehicle component or assembly is actually located, as if the vehicle were "see-through." The VR/AR device may then also allow the technician to select specific components of the depicted assembly in order to retrieve and display detailed information about the component.

Figure 1:
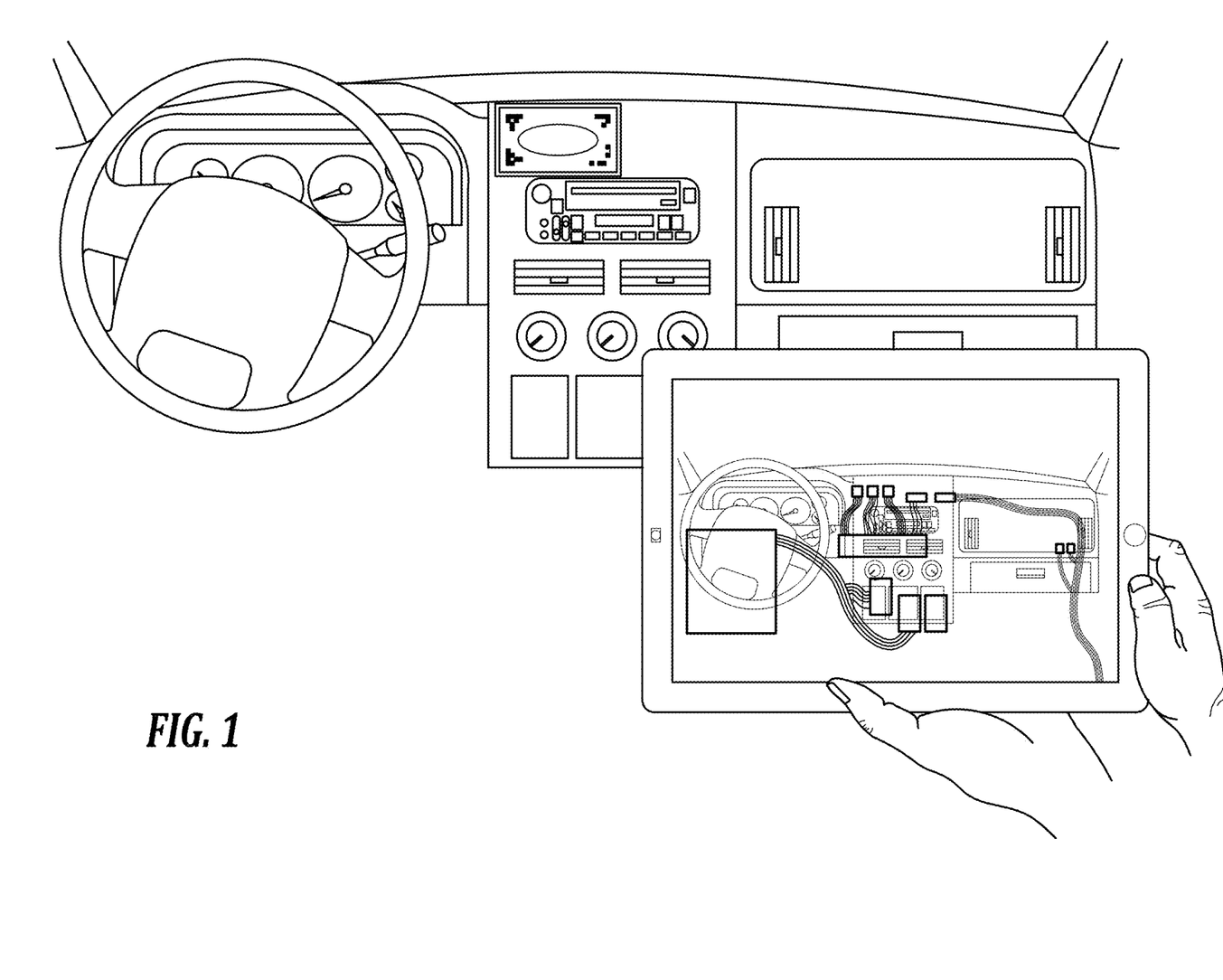
FIG. 1 illustrates an example embodiment of the present disclosure in use within the cab of a vehicle.

FIG. 1 illustrates an example embodiment of the present disclosure in use within the cab of a vehicle. As shown, a technician is within a cab of a vehicle, and is holding up a VR/AR device. The technician is pointing a camera of the VR/AR device at the dash of the vehicle, such that the view of the camera includes a marker that can be used to determine a position and an orientation of the VR/AR device within the vehicle. The VR/AR device then uses its position and orientation within the augmented reality environment to superimpose an image of a wiring harness and/or other components over the video presented by the VR/AR device to create an augmented reality presentation. As can be seen, it appears to the technician that they can see through the dashboard to the hidden components.

Figure 2:
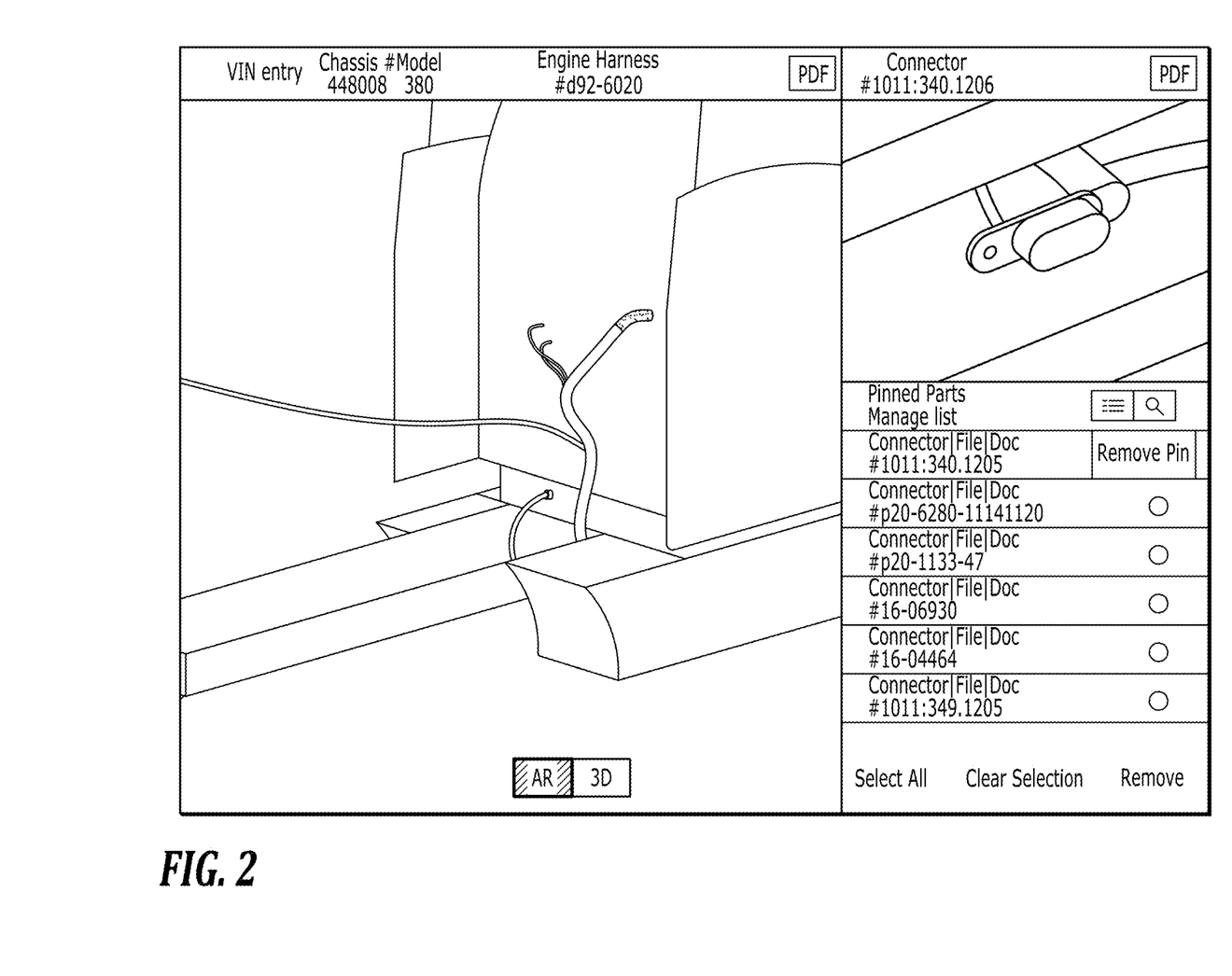
FIG. 2 illustrates an example embodiment of an interface generated by a VR/AR device according to various aspects of the present disclosure.

FIG. 2 illustrates an example embodiment of an interface generated by a VR/AR device according to various aspects of the present disclosure. The interface illustrated in FIG. 2 is presenting a virtual reality view. In some embodiments, the virtual reality view may be navigable using touch gestures such as pinching, swiping, and so on to zoom, rotate, and scroll the display. In some embodiments, the viewpoint of the virtual reality view may be linked to the position and orientation of the VR/AR device as is the augmented reality view described below. As shown, the virtual reality view shows an assembly detail model representing a wire harness. Multiple components of the assembly are highlighted, with one component being selected and illustrated in the upper-right in a detail view. A component may be selected by tapping the component in the virtual reality view, by selecting the component from a list in the bottom right of the interface, or using any other suitable technique. The interface also includes a toggle interface control that allows the technician to switch between the virtual reality view and the augmented reality view.

Figure 3:
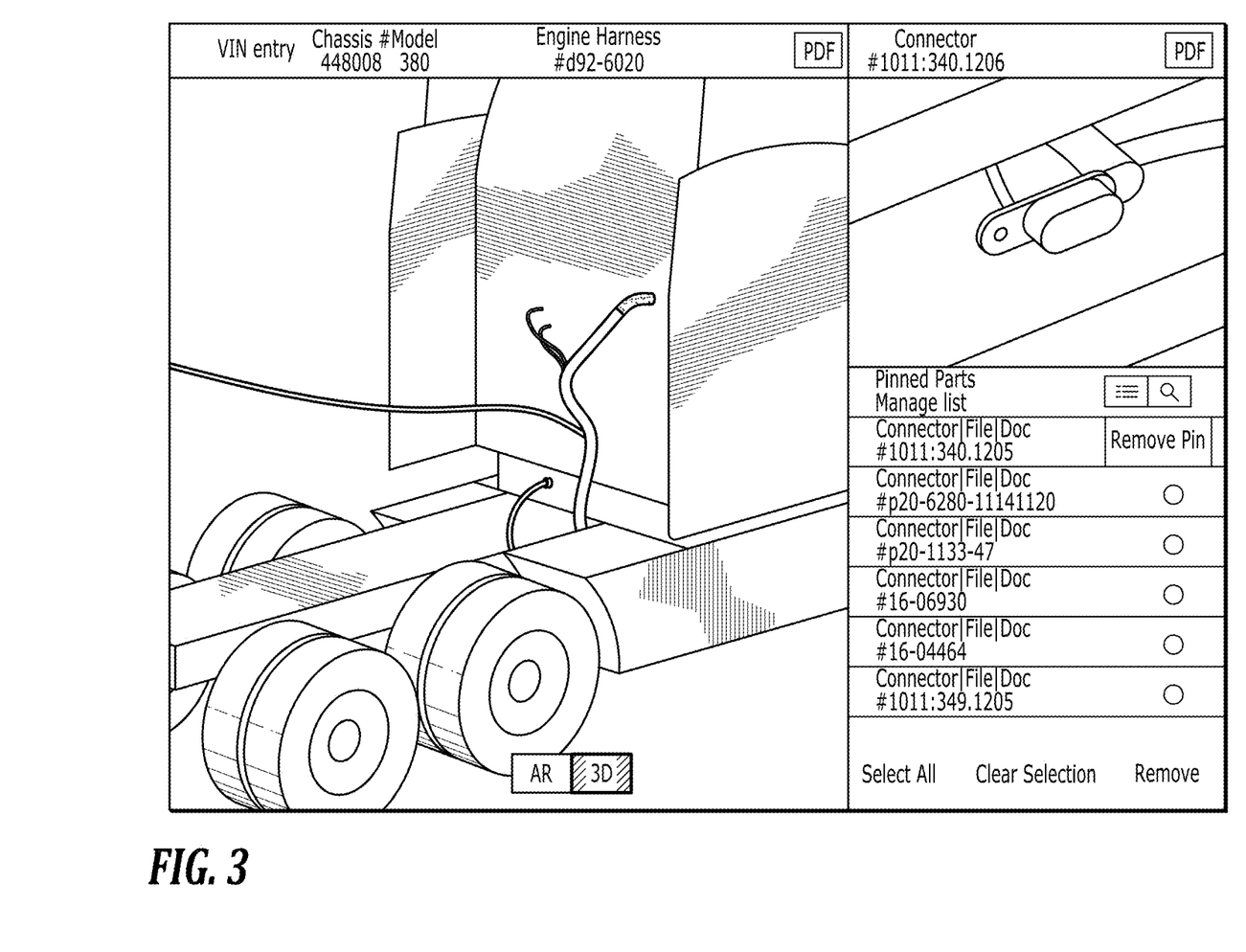
FIG. 3 illustrates another example embodiment of an interface generated by a VR/AR device according to various aspects of the present disclosure.

FIG. 3 illustrates another example embodiment of an interface generated by a VR/AR device according to various aspects of the present disclosure. The interface illustrated in FIG. 3 is presenting an augmented reality view. As shown, the background of the augmented reality view is the video data being generated by the camera of the VR/AR device, while the assembly detail model is superimposed thereon to create the "see-through" effect. The VR/AR device uses the marker to determine its position and orientation with respect to the vehicle, and to therefore determine where to render the assembly detail model. The rest of the interface illustrated in FIG. 3, including the component detail, component list, and so on, are similar to FIG. 2.

Figure 4:
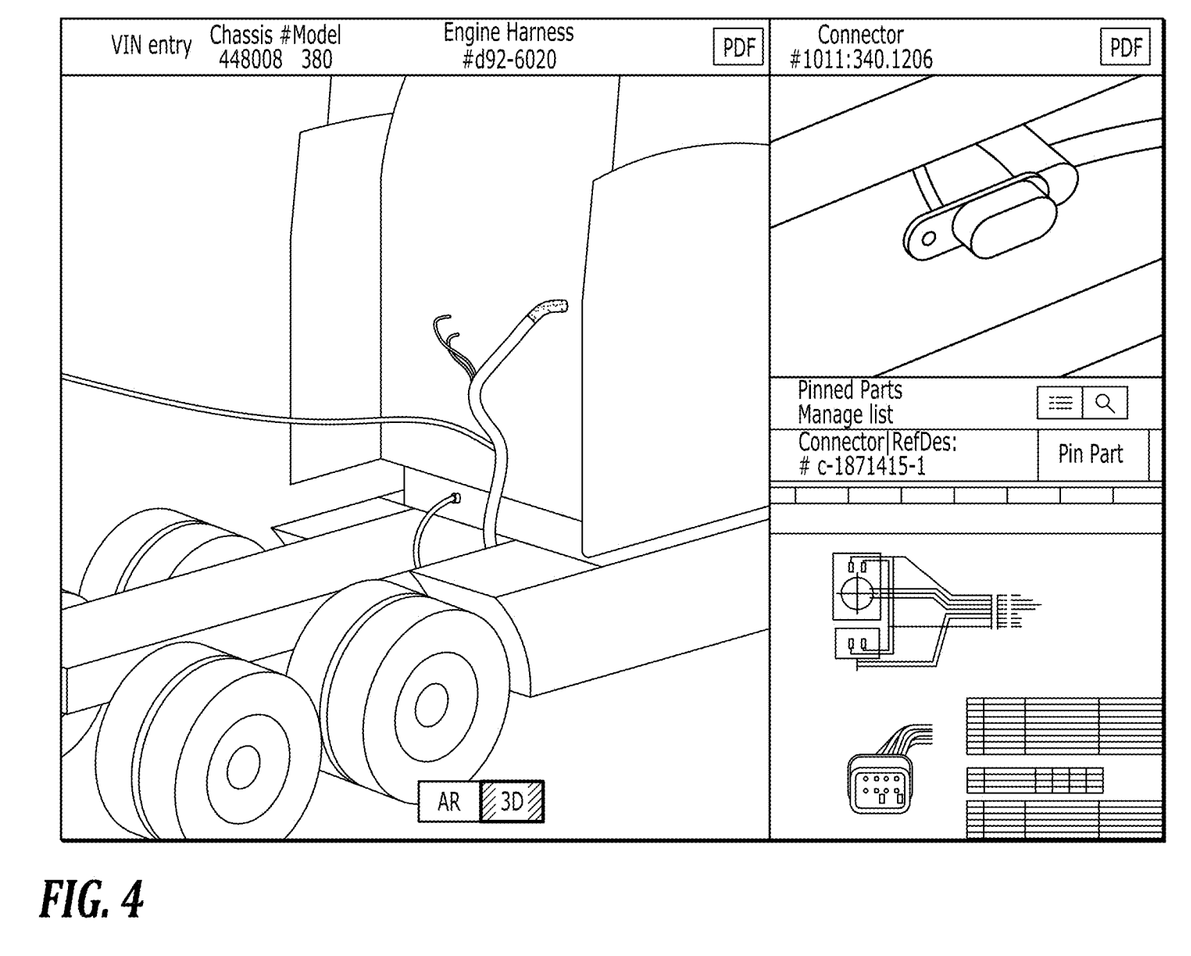
FIG. 4 illustrates yet another example embodiment of an interface generated by a VR/AR device according to various aspects of the present disclosure.

FIG. 4 illustrates yet another example embodiment of an interface generated by a VR/AR device according to various aspects of the present disclosure. The portion of the interface that can be toggled between the virtual reality view and the augmented reality view is still present, as is the component detail portion. The interface in FIG. 4 adds an information presentation. As illustrated, the information presentation portion is presenting a schematic and pin out chart for the selected component. In some embodiments, the information presentation portion may present any other type of information relevant to a selected component.

Figure 5:
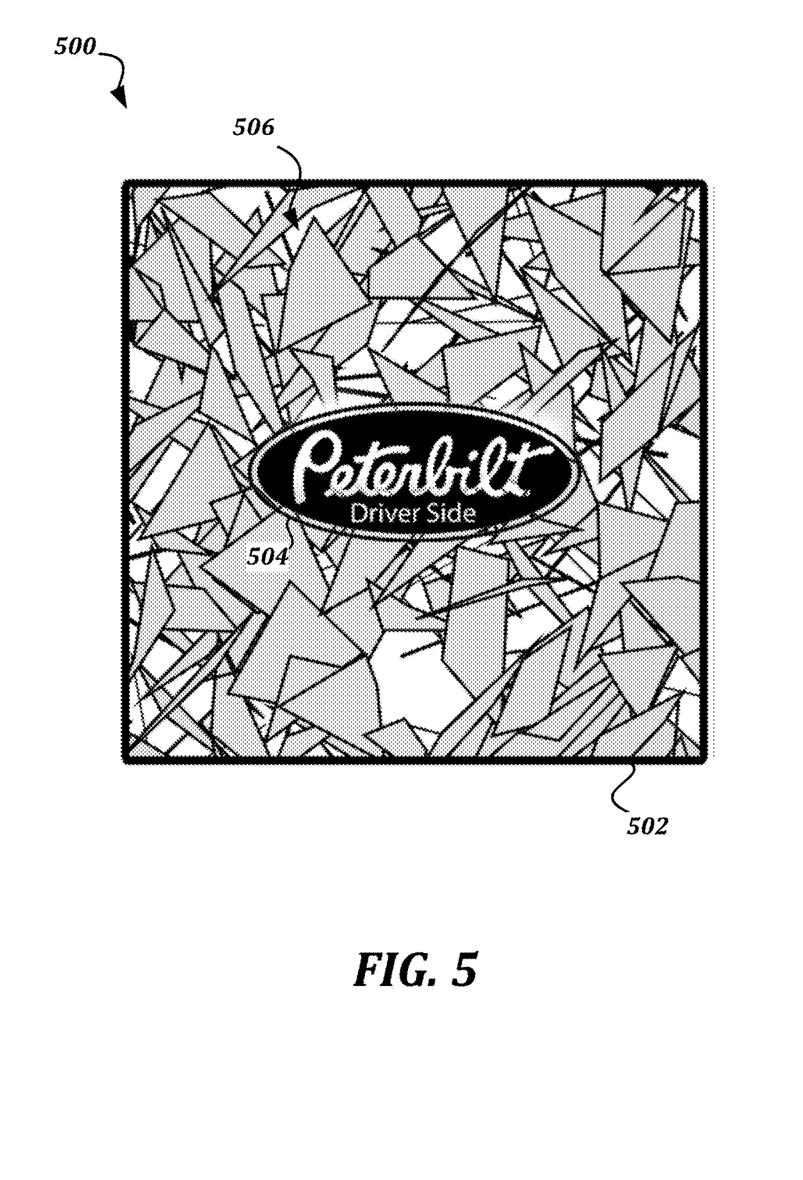
FIG. 5 is an illustration of an example embodiment of a marker pattern according to various aspects of the present disclosure.

FIG. 5 is an illustration of an example embodiment of a marker pattern according to various aspects of the present disclosure. As shown, the marker pattern 500 is surrounded by a solid border 502, and includes a rotationally asymmetrical logo 504 and distinctive pattern 506. The combination of the solid border 502 and the rotationally asymmetrical logo 504 and distinctive pattern 506 allow a VR/AR device to use computer vision techniques to determine an orientation and position of the VR/AR device in relation to the marker pattern. In other words, the VR/AR device can use computer vision to determine how far away the marker pattern is, and an angle to which it is rotated in three-dimensions with respect to the VR/AR device. In some embodiments, aspects of the logo 504 and/or the distinctive pattern 506 may be recognized by the VR/AR device as a unique identifier. For example, the logo 504 includes the text "Driver Side," which may be recognized by the VR/AR device to identify an intended marker placement location for the marker pattern 500. In some embodiments, certain aspects of the logo 504 and/or the distinctive pattern 506 (such as the text) may be ignored by the VR/AR device, and may instead by used as instructions to the technician.

In some embodiments, the marker pattern 500 may be embodied in a sticker, a magnet, a decal, or another removably attachable device to create a marker. In some embodiments, the marker pattern may be applied to a flat plate to create a marker that may then be removably attachable to the vehicle. In some embodiments, the flat plate may have a key blank or other protrusion extending perpendicularly from a rear surface of the flat plate, such that the protrusion may be inserted into a door lock of the vehicle in order to precisely position the marker pattern 500 in relation to the vehicle.

Figure 6:
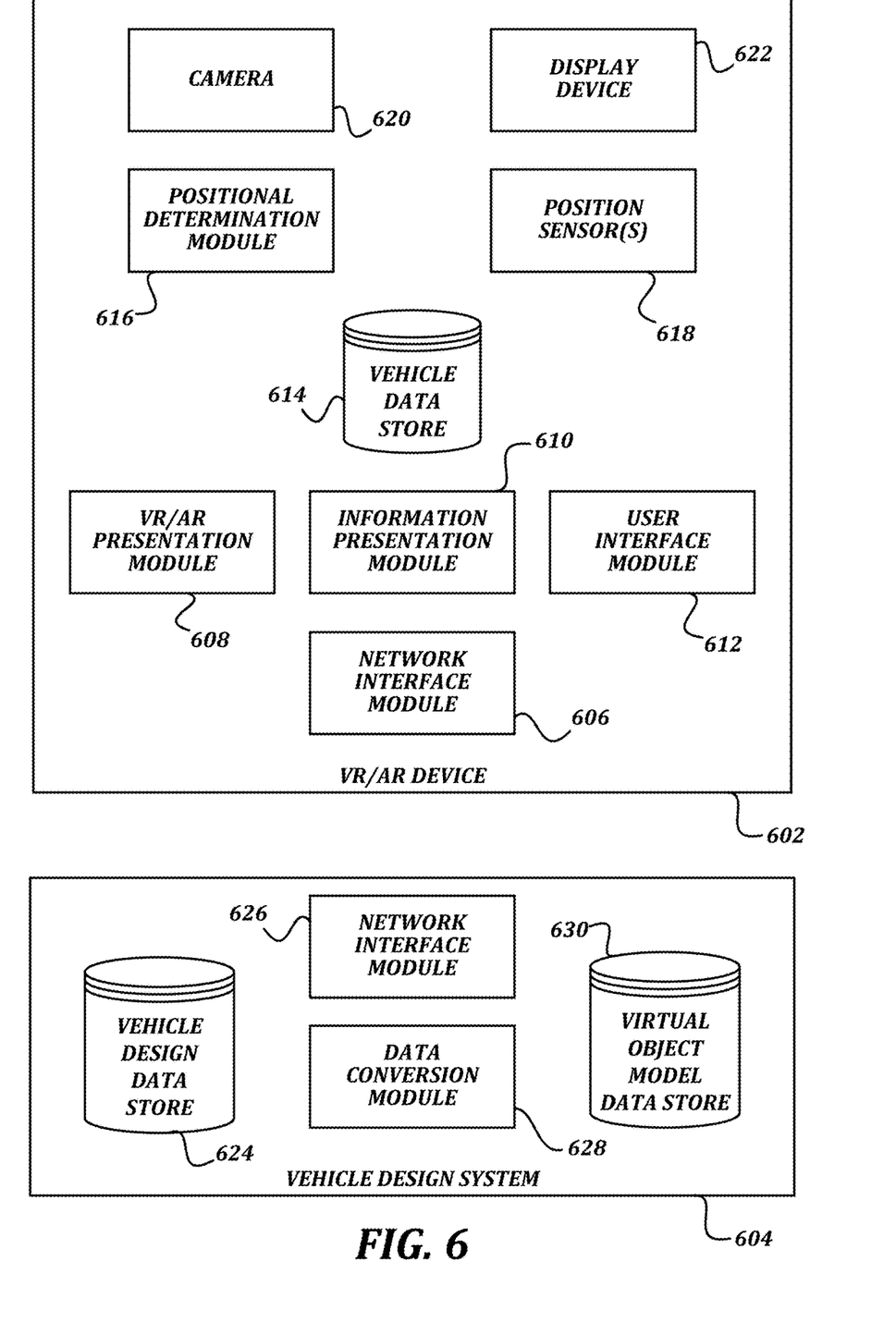
FIG. 6 is a block diagram that illustrates an example embodiment of a VR/AR device and a vehicle design system according to various aspects of the present disclosure.

FIG. 6 is a block diagram that illustrates an example embodiment of a VR/AR device and a vehicle design system according to various aspects of the present disclosure. In some embodiments, the vehicle design system 604 includes a standard computer-aided design (CAD) environment, and may include multiple computing devices and networks to support a team of designers collaborating on a vehicle design. Such systems and techniques are well-known, and so are not described in detail herein for the sake of brevity. The output of such a CAD system is a vehicle design model. The vehicle design system 604 includes a vehicle design data store 624 configured to store vehicle design models produced within the traditional CAD environment.

The vehicle design system 604 also includes a data conversion module 628, a virtual object model data store 630, and a network interface module 626. In some embodiments, the data conversion module 628 is configured to extract information from the vehicle design model created in the CAD system, and to convert it into a format usable by the VR/AR device to create virtual reality presentations, augmented reality presentations, and information presentations. In some embodiments, the virtual object model data store 630 is configured to store the converted information generated by the data conversion module 628. In some embodiments, the network interface module 626 is configured to enable communications between the vehicle design system 604 and the VR/AR device 602. The network interface module 626 may support any suitable data communication technology, including both wired technologies (including but not limited to Ethernet, USB, Firewire, and Lightning) and wireless technologies (including but not limited to Wi-Fi, Bluetooth, WiMAX, 3G, 4G, and LTE). Though FIG. 6 illustrates the vehicle design system 604 as a single box, in some embodiments, one or more computing devices are used to provide the functionality of the vehicle design system 604.

In general, the word "module," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. A module may be compiled into executable programs or written in interpreted programming languages. Software modules may be callable from other modules or from themselves. Generally, the modules described herein refer to logical modules that can be merged with other modules, or can be divided into sub-modules. The modules can be stored in any type of computer-readable medium or computer storage device and be stored on and executed by one or more general purpose computers, thus creating a special purpose computer configured to provide the module.

As understood by one of ordinary skill in the art, a "data store" as described herein may be any suitable device configured to store data for access by a computing device. One example of a data store suitable for use with the potential high capacity demands of a centralized vehicle design system 604 is a highly reliable, high-speed relational database management system (RDBMS) executing on one or more computing devices and accessible over a high-speed network. However, any other suitable storage technique and/or device capable of quickly and reliably providing the stored data in response to queries may be used, such as a key-value store, an object database, and/or the like. Further, for the vehicle design system 604, the computing device providing the data store may be accessible locally instead of over a network, or may be provided as a cloud-based service. A data store may also include data stored in an organized manner on a computer-readable storage medium, as described further below. One example of a data store suitable for use with the demands of the VR/AR device 602, which includes reliable storage but also low overhead, is a file system or database management system that stores data in files (or records) on a computer readable medium such as flash memory, random access memory (RAM), hard disk drives, and/or the like. One of ordinary skill in the art will recognize that separate data stores described herein may be combined into a single data store, and/or a single data store described herein may be separated into multiple data stores, without departing from the scope of the present disclosure.

In some embodiments, the VR/AR device 602 provides functionality for presenting information about a vehicle as described further below. Typical computing devices suitable for use as a VR/AR device 602 include, but are not limited to, tablet computing devices and smartphones. However, any type of computing device with the illustrated components, including but not limited to head mounted display (HMD) devices and laptop computing devices may be used.

As illustrated, the VR/AR device 602 includes a camera 620, a display device 622, and one or more position sensors 618. The camera 620 is typically rear facing, such that it is on an opposite side of the VR/AR device 602 from the display device 622. The display device 622 is typically front facing, such that it is on a side of the VR/AR device 602 that faces the technician during use. In some embodiments, the display device 622 is a touchscreen display device that allows a technician to interact with the images displayed thereon. In some embodiments, the one or more position sensors 618 may be used to detect movements of the VR/AR device 602, and may include sensors including but not limited to accelerometers and altimeters. In some embodiments, the one or more position sensors 618 may be omitted. Because features such as cameras 620, display devices 622, and position sensors 618 are typically included in existing tablet computing devices, smartphones, and the like, further description of these components is not provided herein for the sake of brevity.

The VR/AR device also includes a positional determination module 616, a VR/AR presentation module 608, an information presentation module 610, a user interface module 612, a network interface module 606, and a vehicle data store 614.

The positional determination module 616 is configured to determine a position and orientation of the VR/AR device 602 with respect to the vehicle. In some embodiments, the positional determination module 616 may use only data generated by the camera 620 to make this determination. In some embodiments, the positional determination module 616 may also use data generated by the position sensors 618 to determine position and orientation. The VR/AR presentation module 608 is configured to generate virtual reality presentations and augmented reality presentations of information stored in the vehicle data store 614. In some embodiments, software such as the Unity Engine by Unity Technologies may be used to provide certain aspects of the positional determination module 616 and/or the VR/AR presentation module 608.

In some embodiments, the information presentation module 610 is configured to present detailed information about vehicle components. For example, the information presentation module 610 may present schematic diagrams or pin-out diagrams of selected vehicle components. In some embodiments, the user interface module 612 may accept input from a technician utilizing the VR/AR device 602, and may provide information based on the input to other components of the VR/AR device 602. In some embodiments, the network interface module 606 may be configured to communicate with the network interface module 626 of the vehicle design system 604 via any type of wired or wireless network, as discussed above. In some embodiments, the vehicle data store 614 is configured to store virtual object model files and other information related to vehicles, for use by the VR/AR device 602 in creating presentations. Further description of the configuration of these components is provided below.

Figure 7:
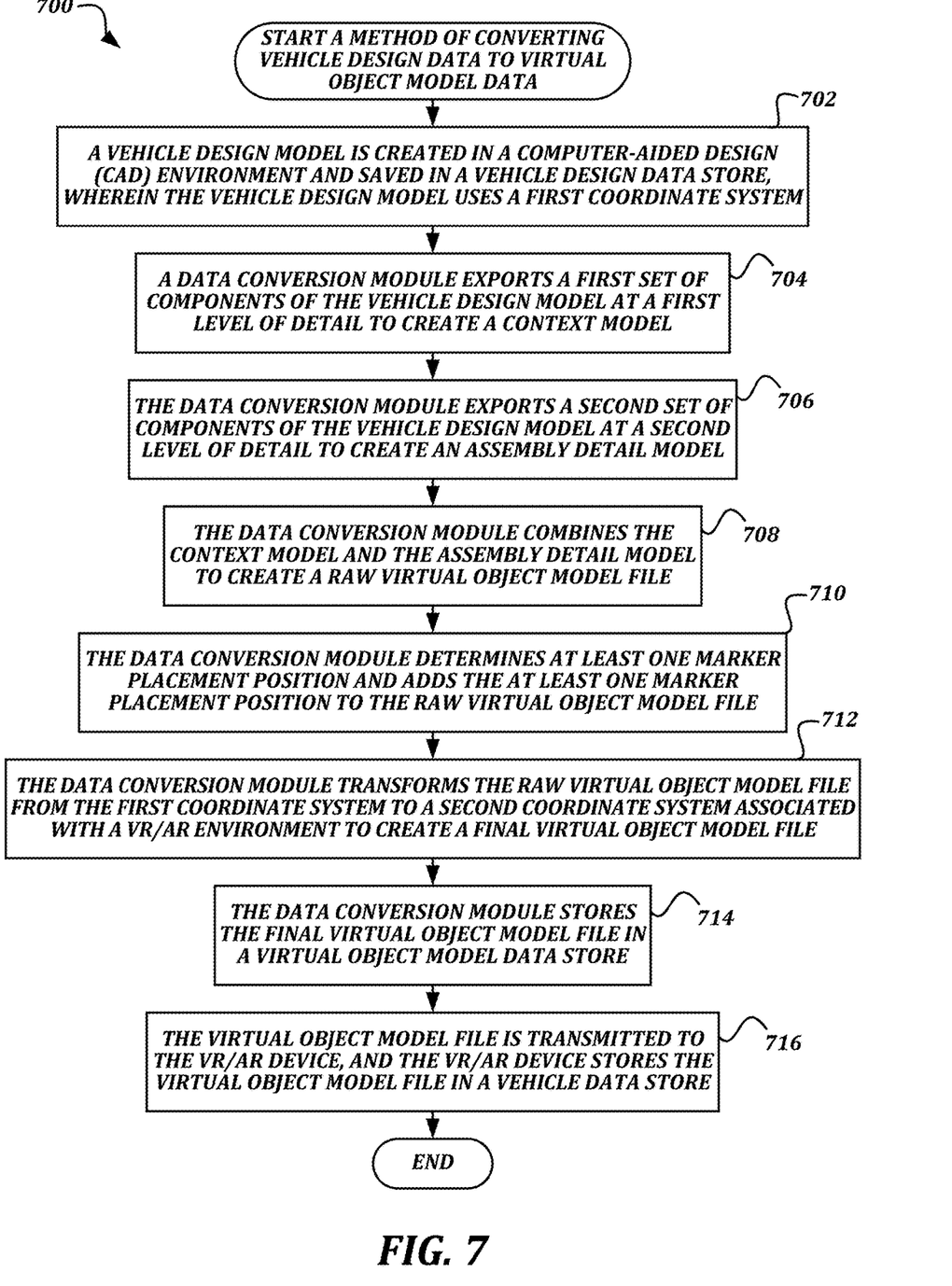
FIG. 7 is a flowchart that illustrates an example method of converting vehicle design data to virtual object model data according to various aspects of the present disclosure.

FIG. 7 is a flowchart that illustrates an example method of converting vehicle design data to virtual object model data according to various aspects of the present disclosure. From a start block, the method 700 proceeds to block 702, where a vehicle design model is created in a computer-aided design (CAD) environment and saved in a vehicle design data store 624, wherein the vehicle design model uses a first coordinate system. One non-limiting example of a CAD environment is the Creo environment, including Creo Parametric, Creo Illustrate, and other tools provided by PTC Inc, though other CAD environments could be used. The process of designing a vehicle in a CAD environment is well known, and so is not described in detail here.

In some embodiments, the vehicle design model may include a plurality of components that represent individual parts of the vehicle. Some non-limiting examples of components are a bolt, a wire connector, a wire, and a body panel. The components may be organized into assemblies, which are groups of components. Some non-limiting examples of assemblies are a steering wheel assembly, a turn signal assembly, and a wire harness. Assemblies may be grouped into systems, and a set of systems make up the vehicle. Some non-limiting examples of systems are a brake system, an electrical system, and an HVAC system. Each component, assembly, system, and vehicle stored in the vehicle design model may include metadata. Metadata may include, but is not limited to, one or more of a part name, a serial number, a material, a fit tolerance, an approved manufacturers, and so on. The first coordinate system includes the scale and orientation of the coordinate system used to locate components of the vehicle design model within the CAD environment. For example, the scale of the first coordinate system may indicate that the units are in centimeters (e.g., 1 unit is 1 centimeter), the origin of the first coordinate system may be at the bottom center of the front bumper, the X axis may extend in a positive direction toward the driver side of the vehicle, the Y axis may extend from the front of the vehicle in a positive direction toward the back of the vehicle, and the Z axis may extend upward in a positive direction.

Next, at block 704, a data conversion module 628 exports a first set of components of the vehicle design model at a first level of detail to create a context model. The context model is intended to provide enough detail to make it clear where other components are located within the vehicle, and so only needs to include enough detail to achieve that goal. For example, in some embodiments the first set of components may include selected components that make up an exterior surface of the truck cab (such as one or more body panels) and/or selected components of the frame rails. The first level of detail may include shape information to allow a representation of the components to be rendered, but may be of a comparatively lower resolution than a second level of detail described below, may combine multiple components into single shapes to be rendered, and may not include metadata.

At block 706, the data conversion module 628 exports a second set of components of the vehicle design model at a second level of detail to create an assembly detail model. The assembly detail model represents an assembly chosen from the vehicle design model, including but not limited to a selected wire harness or a selected steering wheel. The second level of detail may be of a comparatively higher resolution than the first level of detail described above, may be capable of distinguishing multiple components of the assembly from each other, and may include metadata for each component and/or for the assembly as a whole. In some embodiments, the method 700 may create more than one assembly detail model, if multiple assemblies are selected to be exported from the vehicle data model.

Next, at block 708, the data conversion module 628 combines the context model and the assembly detail model to create a raw virtual object model file. Even though the context model and the assembly detail models may have been exported separately, they will align perfectly in the raw virtual object model file because both were exported using the first coordinate system of the vehicle design model. The method 700 then proceeds to block 710, where the data conversion module 628 determines at least one marker placement position and adds the at least one marker placement position to the raw virtual object model file. In some embodiments, the marker placement position may be chosen by a user operating the vehicle design system 604. The marker placement position is specified in the first coordinate system. In some embodiments, the user may choose a position associated with the context model, though in some embodiments, the position chosen by the user may be associated with a component that is not included in the context model, though its location with respect to the context model can precisely be determined by reference to the first coordinate system. In some embodiments, the position is chosen to make it simple for a technician to place the marker at the marker placement position with a high degree of accuracy. In some embodiments, the position may also be chosen in order to have the marker within the field of view of the camera 620 when observing the assembly detail model. In some embodiments, a suitable marker placement position may be associated with a door lock, at least because the door lock is easily accessible, is located in a fixed and readily determinable position within the first coordinate system, and has physical features that allow the marker to be accurately aligned with it. In some embodiments, other positions may be used, including but not limited to attached to a dashboard vent, displayed by an in-vehicle display device, and aligned with a corner of a body panel.

In some embodiments, the VR/AR environment as interpreted and presented by the VR/AR presentation module 608 may use a different coordinate system than the vehicle design system 604. Accordingly, at block 712, the data conversion module 628 transforms the raw virtual object model file from the first coordinate system to a second coordinate system associated with a VR/AR environment to create a final virtual object model file. For example, the first coordinate system may use centimeters as the basic unit, and specify the Z axis as extending up in a positive direction, while the second coordinate system may use inches as the basic unit, and specify the Z axis as extending down in a positive direction. In such an example, the data conversion module 628 may scale all objects in the raw virtual object model file by dividing their size by 2.54, and may flip all objects in the raw virtual object model file to be inverted on the Z-axis, in order to match what is expected by the VR/AR presentation module. In some embodiments, the data conversion module 628 may also export the raw virtual object model file into a format that can be consumed by the VR/AR presentation module 608, such as an FBX format that can then be imported into a Unity file format. In some embodiments, the processing conducted by the data conversion module 628 may also include ensuring that the appropriate metadata is associated with the proper components of the assembly detail models. Though any suitable tools and techniques may be used to accomplish the above, some embodiments may use an export from Creo Illustrate to a U3D format, convert from U3D format to DAE format using Simlab, and may import the DAE format into 3DSMax in order to review the generated models, specify the marker placement position, and export in FBX format before the import into the Unity format. Using this pipeline (or a similar pipeline) may enable the metadata for the components to automatically remain attached to the components of the model, instead of requiring the metadata to be re-attached to the components in the model using a separate process.

At block 714, the data conversion module 628 stores the final virtual object model file in a virtual object model data store 630. At block 716, the virtual object model file is transmitted to the VR/AR device 602, and the VR/AR device 602 stores the virtual object model file in a vehicle data store 614. The virtual object model file may be transferred to the VR/AR device 602 in response to a request for the file, or may be pre-loaded into the vehicle data store 614 before a request is made. The method 700 then proceeds to an end block and terminates.

Figure 8A:
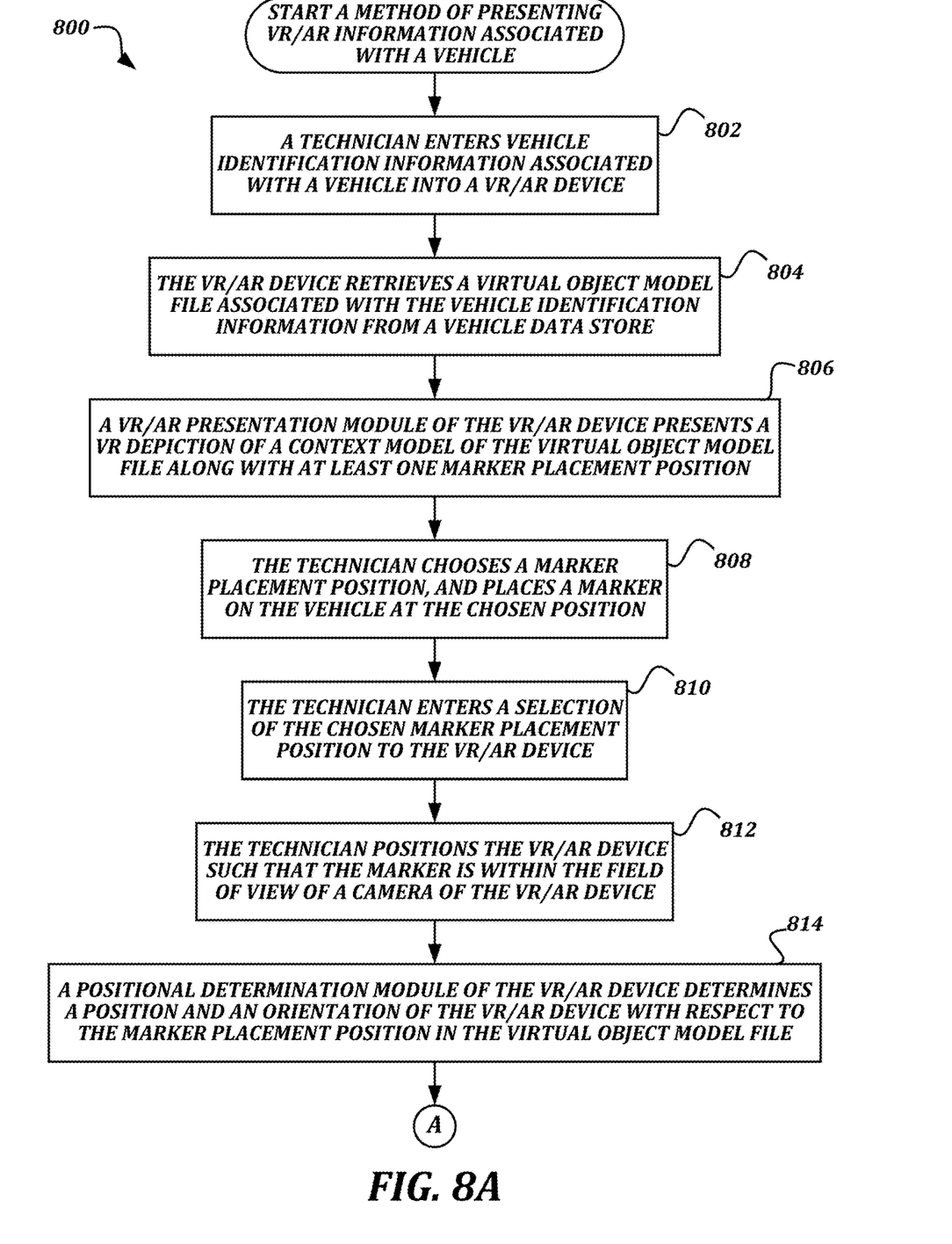
FIGS. 8A-8B are a flowchart that illustrates an example method of presenting VR/AR information associated with a vehicle according to various aspects of the present disclosure.
Figure 8B:
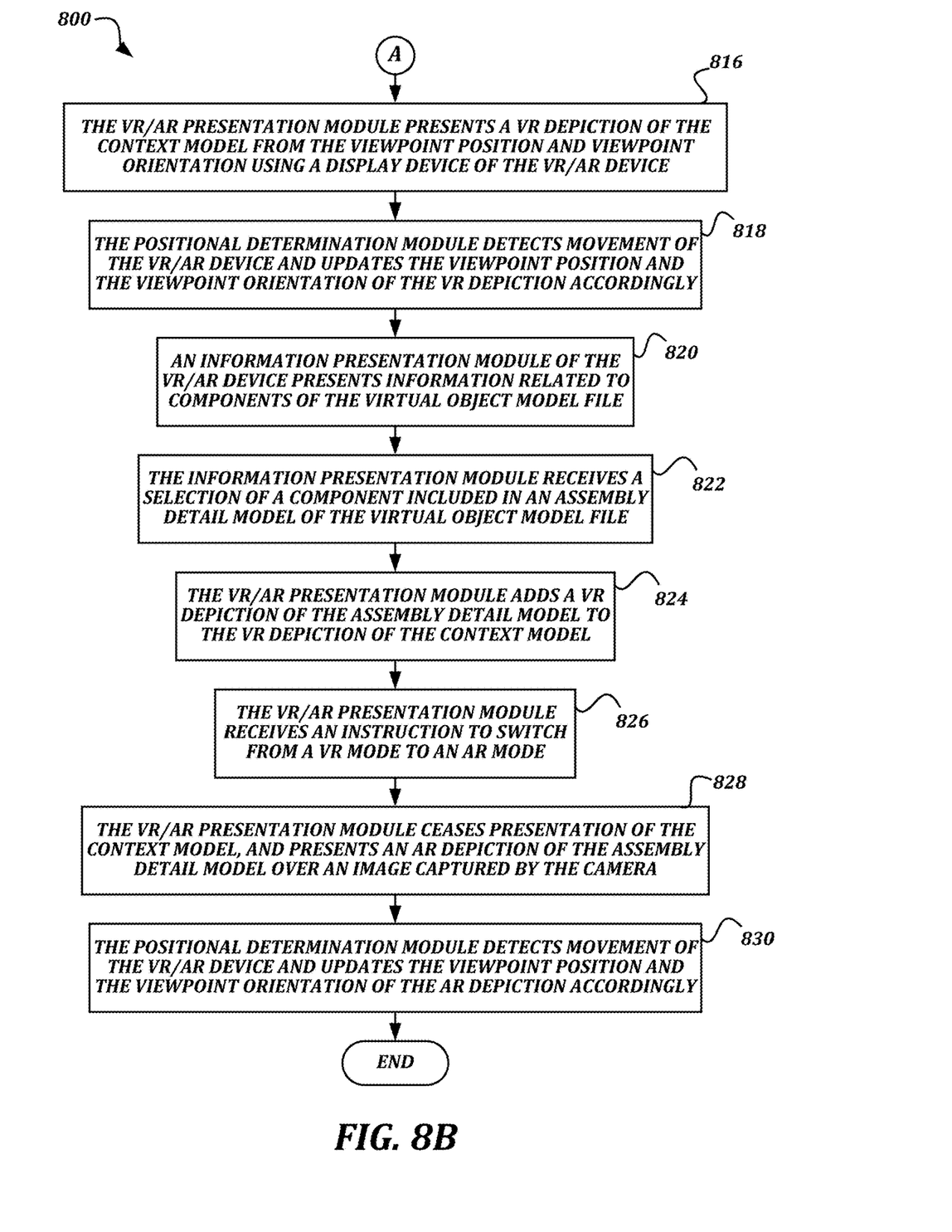

FIGS. 8A-8B are a flowchart that illustrates an example method of presenting VR/AR information associated with a vehicle according to various aspects of the present disclosure. From a start block, the method 800 proceeds to block 802, where a technician enters vehicle identification information associated with a vehicle into a VR/AR device 602. In some embodiments, the user interface module 612 may present an interface that allows the technician to type in a VIN, a model number, or other identification information. In some embodiments, the user interface module 612 may present a list of model numbers or other identifiers that the technician may pick from. In some embodiments, the VR/AR device 602 may include an RFID tag reader that is configured to read an RFID tag coupled to the vehicle that stores the vehicle identification information. In some embodiments, the VR/AR device 602 may use the camera 620 to scan the VIN, a QR code, or another indicator on the vehicle of the vehicle identification information.

Next, at block 804, the VR/AR device 602 retrieves a virtual object model file associated with the vehicle identification information from a vehicle data store 614. In some embodiments, the vehicle identification information is used as a unique index into the vehicle data store 614, and can therefore be used to retrieve the appropriate virtual object model file. In some embodiments, the vehicle identification information may be transmitted to the vehicle design system to retrieve the appropriate virtual object model file. As described above, the virtual object model file may include a context model and one or more assembly detail models. Each assembly detail model may include shapes for depicting components of an assembly, as well as metadata for the components. The context model may give enough information to suggest where the assembly detail models are located within the vehicle, and so may include portions of the cab and/or portions of the frame rails. In some embodiments, the context model is at a lower level of detail than the assembly detail models, in that it does not include metadata and may be at a lower spatial resolution.

At block 806, a VR/AR presentation module 608 of the VR/AR device 602 presents a virtual reality depiction of a context model of the virtual object model file along with at least one marker placement position. The at least one marker placement position is stored in the virtual object model file, and may be shown by the VR/AR presentation module 608 along with the context model in a virtual reality view. At block 808, the technician chooses a marker placement position, and places a marker on the vehicle at the chosen position. At block 810, the technician enters a selection of the chosen marker placement position to the VR/AR device 602. In some embodiments, if only a single marker placement position is present in the virtual object model file, the technician may not have to choose or enter a selection. In some embodiments, presentation of the marker placement positions may also be skipped if the technician is experienced enough to already know the possible marker placement positions for the vehicle. In some embodiments, the VR/AR presentation module 608 may store the chosen marker placement position in order to assist the positional determination module 616 in determining the position and orientation of the VR/AR device 602 as described below.

Next, at block 812, the technician positions the VR/AR device such that the marker is within the field of view of a camera 620 of the VR/AR device 602. To do so, the technician may simply point the VR/AR device 602 at the marker, as illustrated in FIG. 1. In some embodiments, the VR/AR device 602 may use the display device 622 to show a video feed generated by the camera 620 to assist in the positioning.

At block 814, a positional determination module 616 of the VR/AR device 602 determines a position and an orientation of the VR/AR device 602 with respect to the marker placement position in the virtual object model file. That is, the positional determination module 616 determines where the VR/AR device 602 is within the coordinate system of the virtual object model file, based on its relative position to the marker. In some embodiments, the positional determination module 616 may use the images of the marker captured by the camera 620 alone to make the determination. In some embodiments, the positional determination module 616 may use the images of the marker along with location or acceleration information provided by the position sensors 618. In some embodiments, at least some of the functionality of the positional determination module 616 may be natively provided by an operating system of the VR/AR device 602 or by a software engine such as the Unity Engine.

The method 800 then proceeds to a continuation terminal ("terminal A"). From terminal A (FIG. 8B), the method 800 proceeds to block 816, where the VR/AR presentation module 608 presents a virtual reality depiction of the context model from the viewpoint position and viewpoint orientation using a display device 622 of the VR/AR device 602. The virtual reality depiction may include a three-dimensional rendering of the context model against a blank or neutral background.

At block 818, the positional determination module 616 detects movement of the VR/AR device 602 and updates the viewpoint position and the viewpoint orientation of the virtual reality depiction accordingly. In some embodiments, the positional determination module 616 may detect movement using solely the video data generated by the camera 620. In some embodiments, the positional determination module 616 may also use additional information provided by the position sensors 618. By moving the viewpoint position and orientation to match the position and orientation of the VR/AR device 602 with respect to the marker, the technician may be able to easily switch back and forth between a virtual reality mode and an augmented reality mode without becoming disoriented. However, in some embodiments, the technician may wish to navigate within the virtual reality mode without moving the VR/AR device 602. In such embodiments, the technician may be given the option to decouple the viewpoint of the virtual reality depiction from the position and orientation of the VR/AR device 602, and may instead use pinch, swipe, and other gestures to navigate within the virtual reality depiction.

At block 820, an information presentation module 610 of the VR/AR device 602 presents information related to components of the virtual object model file. For example, the information presentation module 610 may provide a list of components of the assembly detail models that are present in the virtual object model file, or names of the assemblies themselves. For example, the information presentation module 610 may present a list that includes an entry for "steering wheel," which may be associated with a steering wheel assembly, or an entry for "ODB II connector," which may be related to a given wiring harness assembly. As another example, the information presentation module 610 may present a list that includes the "steering wheel assembly" and "data wiring harness" directly. In some embodiments, the information presentation module 610 may present another type of interface that guides a technician to the component that they are interested in, such as a troubleshooting script or a tappable schematic diagram.

At block 822, the information presentation module 610 receives a selection of a component included in an assembly detail model of the virtual model object file. In some embodiments, the technician may select the component or assembly from the list as described above. The method 800 then proceeds to block 824, where the VR/AR presentation module 608 adds a virtual reality depiction of the assembly detail model to the virtual reality depiction of the context model. In some embodiments, the assembly detail model may be depicted with a higher level of detail than the context model. In some embodiments, the assembly detail model may be depicted with a brighter, more opaque, or otherwise more emphasized color so that it stands out from the context model. In some embodiments, components of the assembly detail model may be shaded or colored differently to indicate where separate components could be selected for the display of further information. In some embodiments, the virtual reality depiction continues to use updated viewpoint positions and viewpoint orientations as described in block 818, and now also includes updating the depiction of the assembly detail model.

At block 826, the VR/AR presentation module 608 receives an instruction to switch from a virtual reality mode to an augmented reality mode. The instruction may be provided by any suitable technique, including but not limited to a toggle interface control as shown in FIGS. 2 and 3, a voice command, a touch gesture, or a motion gesture. Next, at block 828, the VR/AR presentation module 608 ceases presentation of the context model, and presents an augmented reality depiction of the assembly detail model over an image captured by the camera 620. The augmented reality depiction includes the video captured by the camera 620 with the assembly detail model superimposed thereon. Because the position and orientation of the depiction of the assembly detail model is based on the position and orientation of the VR/AR device 602 with respect to the marker, the augmented reality depiction appears as if it was possible to see through the portions of the vehicle that are occluding the view of the selected assembly. In some embodiments, if the technician is able to use touch gestures or other techniques to navigate within the virtual reality depiction without moving the VR/AR device 602, then the initial establishment of the position and orientation as described in blocks 812 and 814 may be performed upon entering the augmented reality mode.

At block 830, the positional determination module 616 detects movement of the VR/AR device 602 and updates the viewpoint position and the viewpoint orientation of the augmented reality depiction accordingly. This is similar to the actions discussed above with respect to block 818. The main difference here is that now the video data generated by the camera 620 is also being shown, so the updating of the viewpoint position and orientation makes the assembly detail model appear to remain in the same spatial position with respect to the vehicle.

As illustrated in FIG. 8B, the method 800 then proceeds to an end block and terminates. In some embodiments, the VR/AR device 602 may receive a command to return to the virtual reality mode instead of terminating. In such embodiments, the VR/AR device 602 will do so, and will allow the technician to switch freely between the virtual reality mode and the augmented reality mode. One of ordinary skill in the art will recognize that starting in the virtual reality mode and switching to the augmented reality mode is an example only, and that some embodiments may start in the augmented reality mode and switch to the virtual reality mode thereafter.

In some embodiments, the VR/AR device 602 may receive a selection of a component in the assembly detail model, such as via a tap on a component. In such embodiments, the information presentation module 610 may use the metadata of the tapped component to retrieve detailed information from the vehicle data store 614 about the component (such as pin out listings, schematics, and the like), and may use the information presentation module 610 to present the detailed information.

Figure 9:
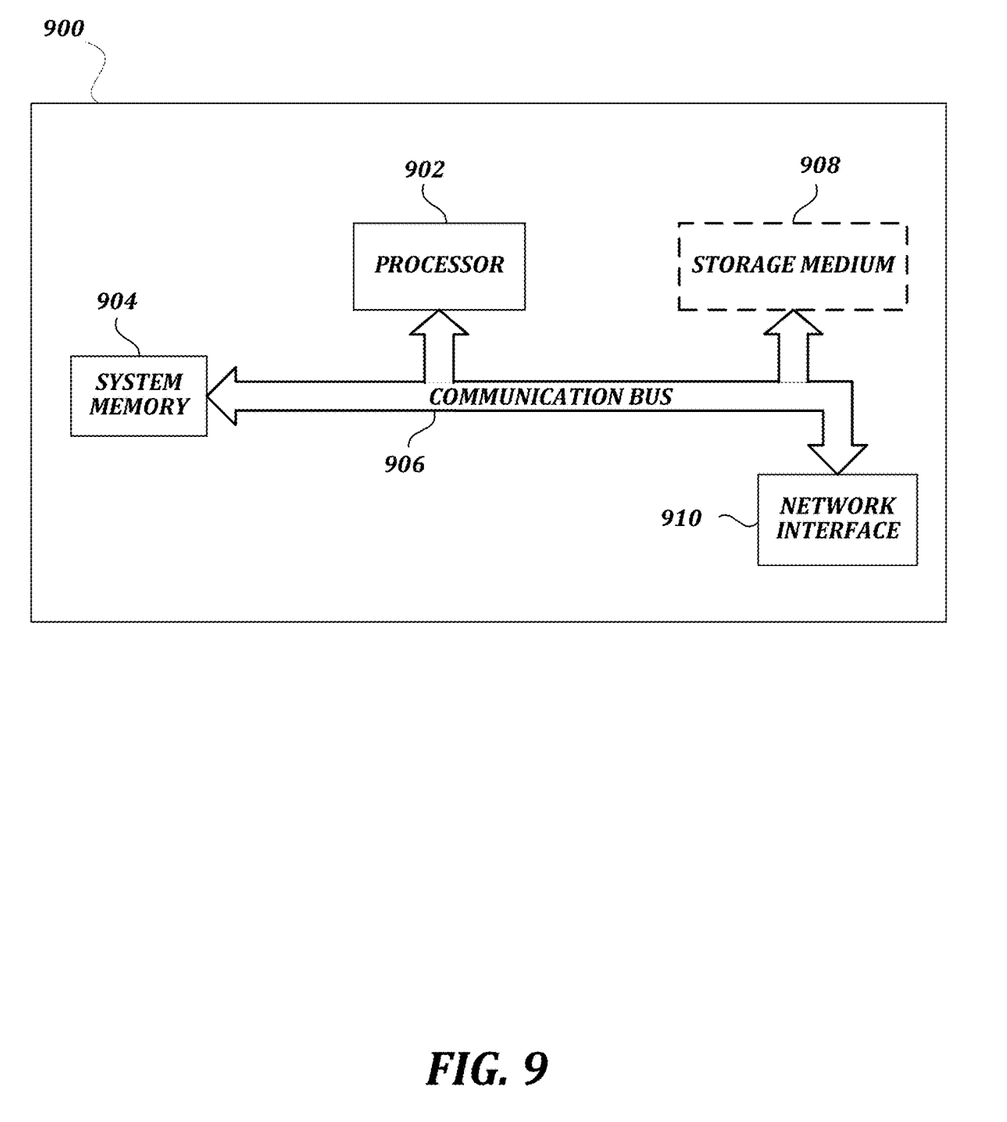
FIG. 9 is a block diagram that illustrates aspects of an exemplary computing device 900 appropriate for use as a computing device of the present disclosure.

FIG. 9 is a block diagram that illustrates aspects of an exemplary computing device 900 appropriate for use as a computing device of the present disclosure. While multiple different types of computing devices were discussed above, the exemplary computing device 900 describes various elements that are common to many different types of computing devices. While FIG. 9 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 900 may be any one of any number of currently available or yet to be developed devices.

In its most basic configuration, the computing device 900 includes at least one processor 902 and a system memory 904 connected by a communication bus 906. Depending on the exact configuration and type of device, the system memory 904 may be volatile or nonvolatile memory, such as read only memory ("ROM"), random access memory ("RAM"), EEPROM, flash memory, or similar memory technology. Those of ordinary skill in the art and others will recognize that system memory 904 typically stores data and/or program modules that are immediately accessible to and/or currently being operated on by the processor 902. In this regard, the processor 902 may serve as a computational center of the computing device 900 by supporting the execution of instructions.

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 910 illustrated in FIG. 9 may represent one or more wireless interfaces or physical communication interfaces described and illustrated above with respect to particular components of the system 100.

In the exemplary embodiment depicted in FIG. 9, the computing device 900 also includes a storage medium 908. However, services may be accessed using a computing device that does not include means for persisting data to a local storage medium. Therefore, the storage medium 908 depicted in FIG. 9 is represented with a dashed line to indicate that the storage medium 908 is optional. In any event, the storage medium 908 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 904 and storage medium 908 depicted in FIG. 9 are merely examples of computer-readable media.

Suitable implementations of computing devices that include a processor 902, system memory 904, communication bus 906, storage medium 908, and network interface 910 are known and commercially available. For ease of illustration and because it is not important for an understanding of the claimed subject matter, FIG. 9 does not show some of the typical components of many computing devices. In this regard, the computing device 900 may include input devices, such as a keyboard, keypad, mouse, microphone, touch input device, touch screen, tablet, and/or the like. Such input devices may be coupled to the computing device 900 by wired or wireless connections including RF, infrared, serial, parallel, Bluetooth, Bluetooth low energy, USB, or other suitable connections protocols using wireless or physical connections. Similarly, the computing device 900 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of providing an augmented reality presentation of a component of a vehicle using a virtual reality/augmented reality (VR/AR) device, the method comprising:
   receiving, by the VR/AR device, an indication of a vehicle type;
   retrieving, by the VR/AR device, a virtual object model file associated with the vehicle type;
   presenting, by the VR/AR device, an instruction to attach a physical marker to the vehicle at a predetermined location specified in the virtual object model file;
   capturing, by a camera of the VR/AR device, at least one image, the at least one image including the physical marker;
   receiving, by the VR/AR device, a selection of an assembly of the vehicle;
   determining, by the VR/AR device and based on the at least one image, a position and an orientation of the VR/AR device with respect to the physical marker; and
   presenting, by the VR/AR device and based on the determined position and orientation of the VR/AR device, an augmented reality depiction of the vehicle including both an output of the camera and an assembly detail model that is included in the virtual object model file and is associated with the selected assembly, wherein the selected assembly comprises a portion of the vehicle that is not visible via the camera of the VR/AR device from the determined position.

2. The method of claim 1, wherein the virtual object model file is based on a computer-aided design (CAD) model used to design the vehicle.

3. The method of claim 1, wherein the predetermined location is associated with a door lock.

4. The method of claim 1, wherein the virtual object model file includes a context model that represents assemblies including at least one of a cab and frame rails.

5. The method of claim 4, further comprising:
   receiving a command to switch from an augmented reality mode to a virtual reality mode;
   switching to virtual reality mode by ceasing presentation of an output of the camera of the VR/AR device and instead beginning presentation of the context model along with the assembly detail model.

6. The method of claim 4, wherein the assembly detail model is at a first level of detail, and wherein the context model is at a second level of detail.

7. The method of claim 6, wherein the first level of detail includes metadata about components depicted by the assembly detail model, and the second level of detail does not include metadata.

8. The method of claim 6, wherein the first level of detail includes two or more sub-assemblies or components, and wherein the second level of detail does not include separate sub-assemblies or components.

9. The method of claim 6, wherein the first level of detail includes data at a first spatial resolution, and the second level of detail includes data at a second spatial resolution lower than the first spatial resolution.

10. The method of claim 1, further comprising presenting reference information about components represented by portions of the assembly detail model visible in the display.

11. The method of claim 1, further comprising presenting reference information about components represented by portions of the assembly detail model visible in the display.

12. A system for use with a vehicle that includes a cab, a set of frame rails, and wire harness, comprising:
   a virtual reality/augmented reality (VR/AR) device that includes a camera and a display;
   wherein the VR/AR device is configured to:
      receive an indication of a type of the vehicle;
      retrieve a virtual object model file associated with the vehicle type;
      present an instruction to attach a physical marker to the vehicle at a predetermined location specified in the virtual object model file, wherein presenting the instruction comprises displaying a model of the virtual object model file, including indicating the predetermined location in a virtual reality depiction of the vehicle;
      receive a selection of an assembly of the vehicle, wherein the assembly is the wire harness;
      capture, by the camera, at least one image, the at least one image including the physical marker;
      determine a position and an orientation of the VR/AR device with respect to the physical marker based at least on the at least one image; and
      present, based on the determined position and orientation of the VR/AR device, an augmented reality depiction of the vehicle including both an output of the camera and an assembly detail model that is included in the virtual object model file and is associated with the wire harness, wherein the wire harness is not visible via the camera from the determined position.

13. The system of claim 12, wherein the physical marker is configured to be coupled to a door lock of the vehicle.

14. The system of claim 12, wherein the VR/AR device configured to:
   receive a command to switch from the augmented reality depiction to the virtual reality depiction; and
   switch to the virtual reality depiction by ceasing presentation of the output of the camera and instead beginning presentation of the context model of the virtual object model file along with the assembly detail model.

15. A method of providing an augmented reality presentation of a component of a vehicle using a virtual reality/augmented reality (VR/AR) device, the method comprising:
   receiving, by the VR/AR device, an indication of a vehicle type;
   retrieving, by the VR/AR device, a virtual object model file associated with the vehicle type;
   capturing, by a camera of the VR/AR device, at least one image, the at least one image including a marker on the vehicle;
   receiving, by the VR/AR device, a selection of an assembly of the vehicle;
   determining, by the VR/AR device and based on the at least one image, a position and an orientation of the VR/AR device with respect to the marker; and presenting, by the VR/AR device and based on the determined position and orientation of the VR/AR device, an augmented reality depiction of the vehicle including both an output of the camera and an assembly detail model that is included in the virtual object model file and is associated with the selected assembly, wherein the selected assembly comprises a portion of the vehicle that is not visible via the camera of the VR/AR device from the determined position.

16. The method of claim 15, wherein the virtual object model file is based on a computer-aided design (CAD) model used to design the vehicle.

17. The method of claim 15, wherein the virtual object model file includes a context model that represents assemblies including at least one of a cab and frame rails.

18. The method of claim 17, further comprising:
receiving a command to switch from an augmented reality mode to a virtual reality mode;
switching to virtual reality mode by ceasing presentation of an image captured by a camera of the VR/AR device and instead beginning presentation of the context model along with the assembly detail model.

19. The method of claim 17, wherein the assembly detail model is at a first level of detail, and wherein the context model is at a second level of detail.

20. The method of claim 19, wherein the first level of detail includes metadata about components depicted by the assembly detail model, and the second level of detail does not include the metadata.

\* \* \* \* \*